Nov. 8, 1927.                                              1,648,429
J. J. TRACY ET AL
DRIVE MECHANISM FOR TRACTORS AND THE LIKE
Original Filed Dec. 6, 1923    2 Sheets-Sheet 2
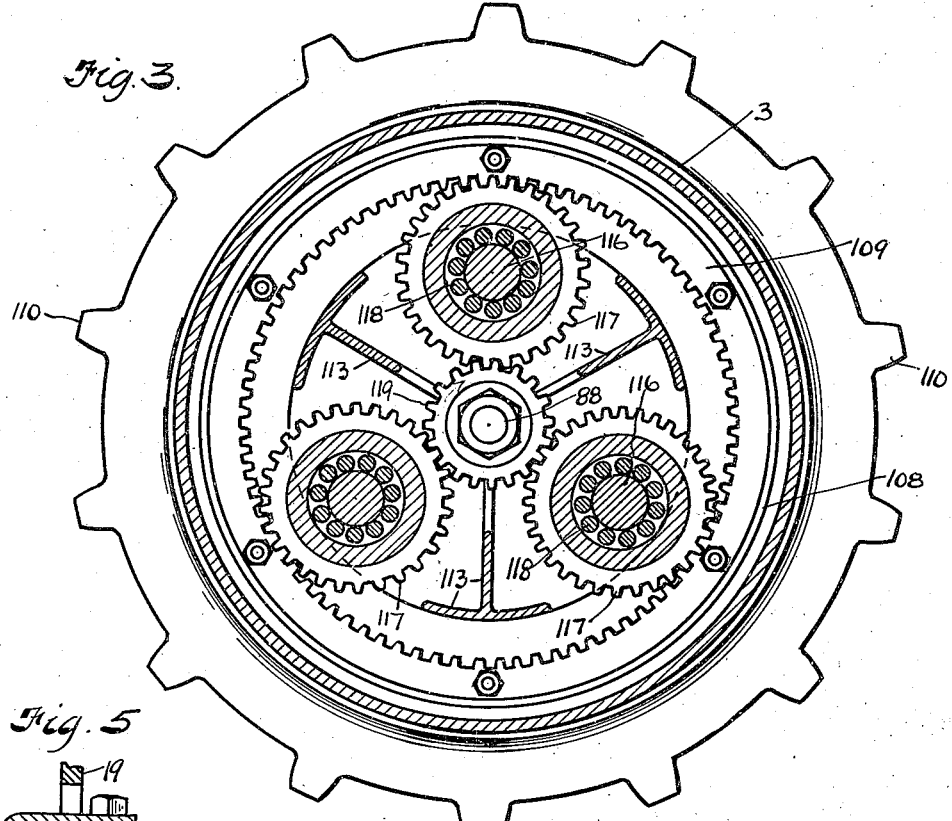
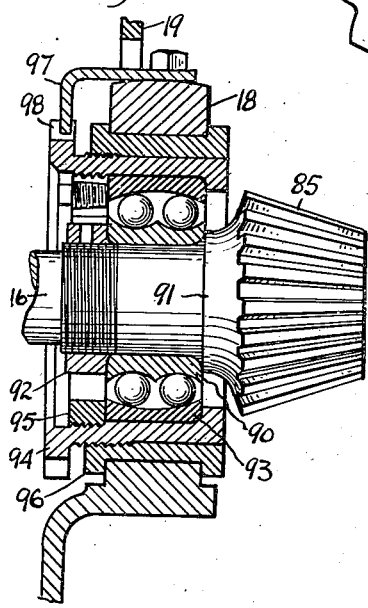
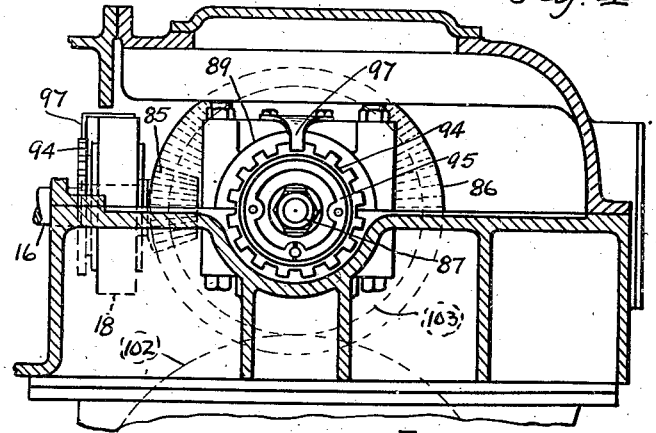
INVENTORS
James J. Tracy and
Arthur E. Palmer
BY Fay, Oberlin + Fay ATTORNEYS Patented Nov. 8, 1927.

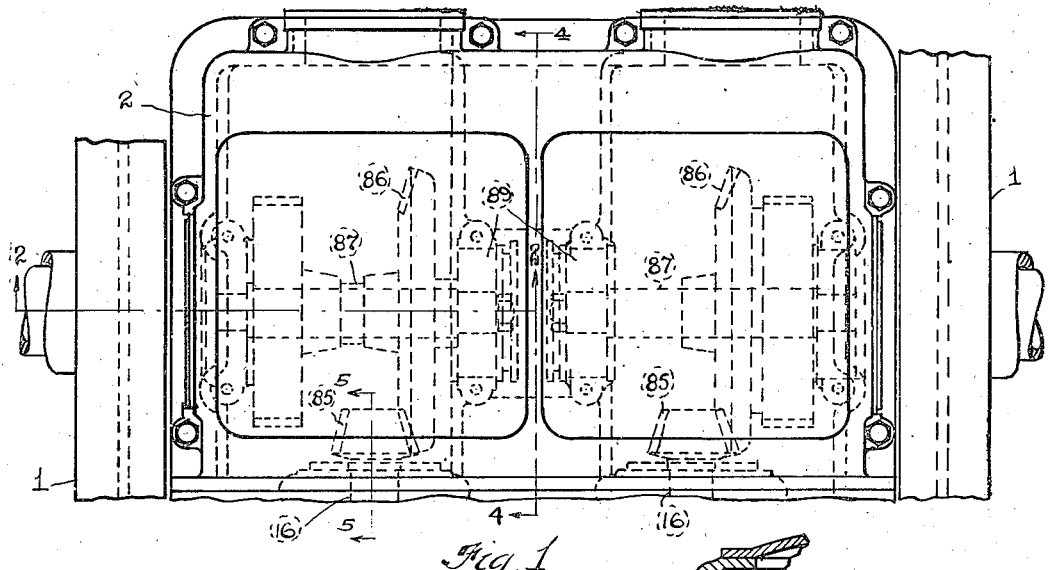
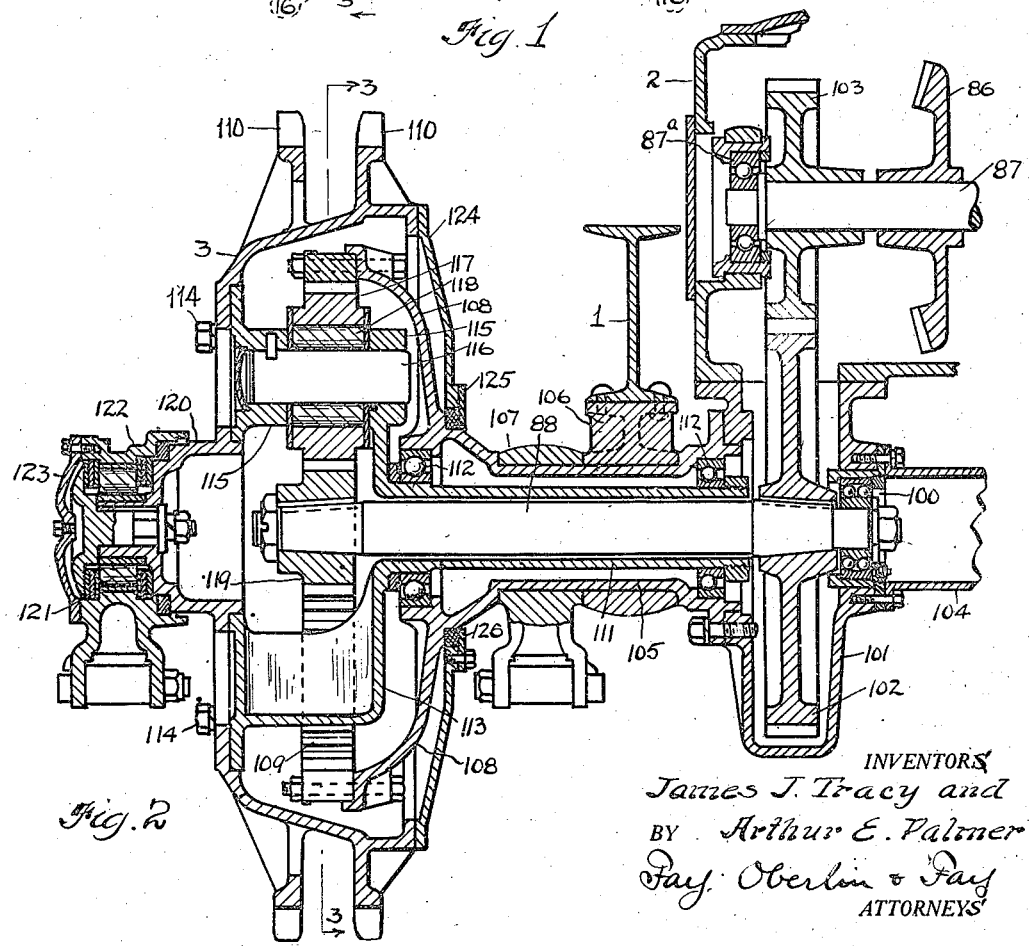

1,648,429

UNITED STATES PATENT OFFICE.

JAMES J. TRACY, OF SHAKER HEIGHTS VILLAGE, AND ARTHUR E. PALMER, OF EAST CLEVELAND, OHIO; SAID PALMER ASSIGNOR TO SAID TRACY.

DRIVE MECHANISM FOR TRACTORS AND THE LIKE.

Original application filed December 6, 1923, Serial No. 678,359. Divided and this application filed December 2, 1924. Serial No. 753,443.

The present improvements comprise in combination with a transmission mechanism for tractors and the like an arrangement of braking and steering means of novel design whereby the turning effect of braking one driving member or the other of the tractor is utilized in order to steer the same. While of general applicability, the improvements are of special interest in connection with tractors of the so-called planking tread or portable track type, in which, instead of driving wheels of the familiar sort, an endless track serves as a means of support and propulsion. In this type of tractor, by providing for the selective driving of the one side or the other, the use of separate steering wheels may be entirely eliminated.

One object of the present invention is to provide a simple and easily operated mechanism for thus selectively braking the one traction member or the other, the same mechanism being adapted for simultaneously braking both such members, where it is desired to stop the tractor or slacken its speed. In this connection clutches are provided back of the first gear reduction instead of behind the bevel drive, whereby the respective driving members may be driven or released as desired and the brakes are applied to the transmission mechanism beyond such clutches so as to enable the corresponding side of the mechanism, including the driving member, to be fully stopped upon uncoupling the motor from such side by appropriate operation of the corresponding clutch. Furthermore, where operating under load it becomes unnecessary to apply the brake at all, in order to secure the desired turning effect. The mechanism also includes an improved mounting for the driving members as well as a novel arrangement of gearing for connecting the transmission mechanism with such members.

The present application which has been divided out of our copending application, Serial No. 678,859, filed December 6, 1923, relates more particularly to the means provided for accomplishing the last mentioned object. These means will be hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Fig. 1 is a broken plan view of a drive mechanism embodying the present improvements; Fig. 2 is a transverse section of a portion of the mechanism, the plane of the section being indicated by the line 2—2, Fig. 1; Fig. 3 is a transverse section of the driving member and gearing associated therewith, the plane of such section being indicated by the line 3—3, Fig. 2; and Figs. 4 and 5 are transverse sections of still other portions of the mechanism with parts appearing in elevation, the planes of sections being indicated by the lines 4—4 and 5—5 of Fig. 1.

For the purpose in hand, it has been deemed necessary to illustrate and describe only the rear portion of the tractor wherein the invention here of interest is embodied.

Of the frame which carries the driving mechanism and which is supported on the traction members hereinafter referred to, only broken portions of said members 1 are shown (see Fig. 1), these being preferably of I-beam section as shown in Fig. 2. These frame members serve to support the sectional housing 2 wherein the drive mechanism of the present invention is mounted, said members in turn being supported on driving members 3, (see Figs. 2 and 3) which are shown as sprocket wheels adapted to carry an endless track of familiar type, as need not be described in detail.

The power for driving the respective members 3 is transmitted thereto from two parallel shafts 16 suitably journaled in housing 2, these shafts being connected with a suitable motor or engine in the forward part of the machine through the medium of intermediately located speed change gears and clutches which with associated brake mechanism are so arranged that said shafts 16 may be driven either simultaneously or individually and so that they may be similarly braked either simultaneously or individually.

The rear end of each shaft 16 carries, preferably integrally formed therewith, a beveled pinion 85 (Fig. 1) that meshes with a corresponding beveled gear 86 keyed or otherwise fixedly secured on a short transverse shaft 87. From the latter is driven in turn a live axle section 88 which drives the corresponding sprocket wheel 3 or equivalent traction member (see Fig. 2). As shown in Fig. 1, both beveled gears 86 face in the same direction since in the construction shown it is assumed that the two shafts are driven in the same direction by the gearing that connects said shafts 16 with the motor. Accordingly, the one beveled gear 86 will face inwardly and the other face outwardly with respect to the longitudinal median line of the mechanism. Other than in this particular, the driving connections between the respective shafts 16 and the corresponding wheels 3 are identical on both sides.

The outer end of each shaft 87 is journaled in a radial ball bearing 87$^a$ supported in the adjacent side wall of housing 2 (see Fig. 2), while the inner end of such shaft is journaled in a combination radial and thrust bearing 89 (shown in end elevation in Fig. 4) of the same design as those wherein the rear ends of shaft 16 are journaled. Each of these bearings (see Fig. 5) comprises an inner raceway 90 secured in place on the shaft by being forced against a shoulder 91 thereon by means of a nut 92. In the case of the bearings for shafts 16, the base or hub of the beveled gear 85 provides the shoulder in question, while in the case of shaft 87, a shoulder is formed specially for the purpose. So too in the case of such last mentioned shafts, the abutment is directed outwardly towards the end of the shaft instead of inwardly, but the construction otherwise is identical. The outer raceway 93 is carried in a shell 94, being secured in place therein by means of an externally threaded ring 95, and such shell is in turn secured in a bushing 96 that forms the direct support for the bearing as a whole. The shell has threaded engagement with such bushing so that by rotation thereof, its position may be longitudinally shifted in the latter, a keeper 97 that is adapted to engage with one of a series of peripheral notches 98 in the shell being provided to lock the latter in adjusted position. It will be noted that longitudinal adjustment of such shell, by carrying with it the outer raceway, serves correspondingly to displace or adjust the inner raceway and therewith the shaft. In this way proper meshing of the gears may be initially secured and wear taken up with relatively little trouble.

The live axle section 88 is full floating, its inner end being journaled in a self-aligning bearing 100 mounted in a gear housing 101 that depends beneath the main housing 2 and serves to enclose a large spur gear 102 that is keyed on said shaft and meshes with a smaller spur gear 103 keyed on the corresponding shaft 87 located directly there-above. The inwardly directed faces of the two gear housings 101 are connected together by a tubular strut 104 which insures rigidity to the structure. Projecting outwardly from said gear housing 101 is a short tubular housing 105 upon which rests the corresponding side frame member 1, the latter being secured thereto by a bearing block 106 that permits necessary slight relative rotative movement incidentally to weaving of the frame. Said tubular housing 105 similarly has attached thereto one of the blocks 107 to which is secured the frame of the traction member where the tractor is of the endless track or crawler type as in the case in hand. There is furthermore secured to the outer end of said tubular housing 105, by means of spider arms 108, an internally toothed ring gear 109.

The sprocket wheel 3 consists, as shown in Fig. 2, of a hollow body provided about its periphery with two rows of sprocket teeth 110 and is supported in the housing 105 by means of a tubular hub 111 that surrounds but does not contact with the live axle section 88. This hub is journaled in suitable ball bearings 112 at the respective ends of the tubular casing and is formed at its outer end with integral spider arms 113, to which sprocket wheel 3 is secured by means of bolts 114. Formed intermediately of the arms 113, which are shown as three in number (see Fig. 3), but integrally joined therewith in front and with the hub 111 in the rear respectively, are apertured supports 115 wherein are held short spindles 116 on each of which in turn is mounted a spur pinion 117 through the medium of roller bearings 118. The three pinions 117 are driven by means of a fourth pinion 119 that is keyed to the outer end of axle section 88 and engage with the teeth of the ring gear 109. The ring gear being relatively stationary, rotation of shaft 88, and thus of pinion 119, will cause the pinons 117 to travel around said ring gear at a reduced rate of speed, carrying therewith the composite wheel structure consisting of hub 111, the spider arms 113 and the sprocket wheel 3, as will be readily understood.

It will be noted that as shown in Fig. 3, the idler pinions 117 are loosely mounted on their bearings on spindles 116, a clearance of at least 1/64th of an inch being left in practice between the inner bearing surfaces of said pinions and the roller bearings 118. As a result of this construction, said idler pinions are rendered self centering and the driving torque will be transmitted equally through all three, instead of only through one, as is apt to be the case if it is attempted to so mount the spindles 116 and the pinions thereon as to accurately mesh with the driving pinion 119 and the ring gear 109.

The sprocket wheel 3 is formed with a central outwardly projecting boss 120 on which is supported, through the medium of roller bearing 121, a companion block 122 to the block 107 for the purpose of supporting the outer frame of the traction member (not shown). A cap 123 closes such bearing 121 against the entrance of dust and in order similarly to close the inner side of the sprocket wheel 3, an annular plate 124 is attached to such side of the wall adjacent its periphery, such plate being closely fitted against the tubular housing 105 by means of a ring 125 secured thereto and pressing against an interposed ring 126 of packing material.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a motor vehicle, the combination of two side frame members, a tubular housing rockably mounted in bearings in each said frame member, an internal gear carried by each housing, a tubular shaft within each housing supported directly thereagainst by bearings at each end, said shaft carrying a plurality of idler pinions meshing with said internal gear, a driving axle within each said tubular shaft carrying a pinion for driving the respective idler pinions, and a strut connecting the inner ends of said housings.

2. In a motor vehicle, the combination of a ring gear, a tubular shaft carrying a plurality of idler pinions for engaging said gear, a means in common externally supporting said tubular shaft for rotation and carrying said ring gear, and a driving axle in said tubular shaft having a pinion for engaging the idler pinions, sufficient play being allowed between the latter and their corresponding spindles to permit said pinions to center themselves.

3. In a motor vehicle, the combination of a ring gear, a tubular shaft carrying a plurality of idler pinions for engaging said gear, a tubular member surrounding and rotatively supporting said tubular shaft and carrying said ring gear, and a driving axle in said tubular shaft having a pinion for engaging the idler pinions, said driving axle being supported at its inner end in a self aligning bearing and being otherwise clear of said tubular shaft and said idler pinions being loosely mounted on their bearings, whereby complete equalization in the driving force applied to said idler pinions by the pinion on said axle is secured.

4. In a motor vehicle, the combination of a ring gear, a tubular shaft carrying a plurality of idler pinions for engaging said gear, common means supporting said tubular shaft for rotation and carrying said ring gear, and a driving axle in said tubular shaft having a pinion for engaging said idler pinions, said driving axle being supported at its inner end in a self aligning bearing and being otherwise clear of said tubular shaft and said idler pinions being loosely mounted on their bearings, whereby complete equalization in the driving force applied to said idler pinions by the pinion on said axle is secured.

5. In a motor vehicle, the combination of a ring gear, a tubular shaft carrying a plurality of idler pinions for engaging said gear, a means in common supporting said tubular shaft for rotation and carrying said ring gear, and a driving axle in said tubular shaft having a pinion for engaging the idler pinions, sufficient play being allowed between the latter and their corresponding spindles to permit said pinions to center themselves.

6. In a motor vehicle, the combination of a ring gear, a tubular shaft carrying a plurality of idler pinions for engaging said gear, common means supporting said tubular shaft for rotation and carrying said ring gear, and a driving axle in said tubular shaft having a pinion for engaging said idler pinions, said driving axle being supported clear of said tubular shaft and said idler pinions being loosely mounted on their bearings, whereby complete equalization in the driving force applied to said idler pinions by the pinion on said axle is secured.

Signed by us, this 1st day of December, 1924.

JAMES J. TRACY.
ARTHUR E. PALMER.